US008855283B2

(12) United States Patent
Agarwal

(10) Patent No.: US 8,855,283 B2
(45) Date of Patent: Oct. 7, 2014

(54) PROVIDING ENHANCED WIRELINE SERVICES

(75) Inventor: Ashish Agarwal, Longmont, CO (US)

(73) Assignee: Qwest Communications International Inc., Denver, CO (US)

( * ) Notice: Subject to any disclaimer, the term of this patent is extended or adjusted under 35 U.S.C. 154(b) by 614 days.

(21) Appl. No.: 13/029,711

(22) Filed: Feb. 17, 2011

(65) Prior Publication Data

US 2012/0213353 A1  Aug. 23, 2012

(51) Int. Cl.
*H04M 3/42* (2006.01)
*H04M 3/54* (2006.01)

(52) U.S. Cl.
CPC .. *H04M 3/42263* (2013.01); *H04M 2203/2094* (2013.01); *H04M 3/54* (2013.01)
USPC ............ 379/201.02; 379/201.03; 379/212.01; 379/70; 379/72; 379/88.01

(58) Field of Classification Search
USPC ........................................ 379/201.01–218.02
See application file for complete search history.

(56) References Cited

U.S. PATENT DOCUMENTS

| | | | |
|---|---|---|---|
| 6,411,802 B1* | 6/2002 | Cardina et al. | 455/424 |
| 7,171,221 B1* | 1/2007 | Amin et al. | 455/445 |
| 7,194,268 B1* | 3/2007 | Bosik et al. | 455/445 |
| 7,729,489 B2* | 6/2010 | Lee et al. | 379/212.01 |
| 2008/0261603 A1* | 10/2008 | Sever et al. | 455/445 |
| 2010/0128857 A1* | 5/2010 | Logan | 379/88.22 |
| 2010/0183134 A1* | 7/2010 | Vendrow et al. | 379/201.06 |

* cited by examiner

*Primary Examiner* — Joseph J Nguyen
(74) *Attorney, Agent, or Firm* — Swanson & Bratschun, L.L.C.

(57) ABSTRACT

Novel tools and techniques that provide enhanced wireline services at one or more known wireline locations. In some cases, these tools and techniques involve determining that a subscriber is at one or more of the known wireline locations based on a detected location of the subscriber's wireless device (e.g., wireless phone, portable computer, etc.). Once the subscriber's presence at that wireline location has been detected, enhanced services can be provided to a wireline telephone at that location.

23 Claims, 6 Drawing Sheets

US 8,855,283 B2

PROVIDING ENHANCED WIRELINE SERVICES

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to the provision of telephone service, and more particularly, to the provision of enhanced wireline services to a subscriber, based at least in part on a location of a wireless device associated with the subscriber.

BACKGROUND

Wireless devices play an increasingly important role in everyday life. A "wireless device," as used herein, means any mobile device that is capable of determining its own location (e.g., using internal hardware/software, by receiving location information from an external device, and/or the like) and is capable of transmitting and/or receiving data on a network (e.g., a wireless network that provides connectivity to the Internet, a cellular network, etc.). Examples of such devices include, without limitation, wireless phones (e.g., phones operating on wireless wide area networks ("WWAN"), such as code division multiple access ("CDMA") networks and their derivatives, Global System for Mobile Communication ("GSM") networks and their derivatives, and/or the like; and/ or on wireless local area networks ("WLAN"), such as WiFi networks and/or the like), wireless portable computers (e.g., computers, including handheld computers, laptop computers, etc. that can operate on similar wireless networks, etc.), and smartphones, which may combine the features of wireless phones and wireless portable computers. Such wireless devices provide subscribers with mobile connectivity, allowing subscribers not only to communicate when mobile (e.g., via electronic mail, voice calls, etc.), but also providing information to facilitate such communication (e.g., with address books, calendars, etc. that are synchronized with personal computers and/or enterprise platforms).

As subscribers have become accustomed to the convenience and mobility provided by such devices, traditional facilities such as public pay phones and paper directory listings have become relatively scarce, since a wireless subscriber can carry with him both the means to obtain contact information for third parties as well as the means for conducting communication with those third parties. Further, a wireless subscriber can place and receive voice calls in any area in which coverage exists. No longer does a subscriber need to inform contacts of his location in order to receive calls when away from home. (While manual call forwarding can address this issue somewhat, many subscribers have difficulty remembering to activate manual call forwarding and/or remembering the operations required to do so).

Currently, however, mobile devices are not ideal for every communication situation. For example, wireless network quality varies, inter alia, with usage levels and location. In part because of this variance, wireline telephone service (including without limitation Plain Old Telephone System ("POTS") and other public switched telephone networks ("PSTN"), Voice over Internet Protocol ("VoIP") and other packet switched networks) often is considered by subscribers to have greater reliability and/or call quality in a given location than wireless voice service, which can vary according to network coverage and conditions. Moreover, many wireless service plans charge per-minute usage rates, which renders some subscribers reluctant to use a wireless phone in locations where wireline service is available.

BRIEF SUMMARY

Certain embodiments provide solutions that can provide some of the advantages of both wireline and wireless service, while minimizing some of the disadvantages of each. Some of these solutions comprise tools and techniques that provide enhanced wireline services at one or more known wireline locations. In some cases, these tools and techniques involve determining that a subscriber is at one or more of the known wireline locations based on a detected location of the subscriber's wireless device (e.g., wireless phone, portable computer, etc.). Once the subscriber's presence at that wireline location has been detected, enhanced services can be provided to a wireline telephone at that location.

Merely by way of example, in some cases, providing enhanced wireline services can comprise automatically forwarding telephone calls, which might be directed to one or more telephone numbers ("forwarded numbers") associated with the subscriber, to a number corresponding to the wireline telephone at that location. The forwarded number(s) can include, without limitation, the subscriber's wireless number, other wireline numbers (e.g., a subscriber's home telephone number, work telephone number, and/or the like). Thus, when a subscriber is at a known location, calls for that subscriber (at any of several numbers, in some cases) can be forwarded to a wireline telephone at that location. Alternatively, if the subscriber is not at a location that corresponds to any known location, calls might be forwarded to the wireless device. In an aspect, such embodiments can provide the mobility and accessibility traditionally afforded by wireless telephones, but without the attendant disadvantages of wireless services (e.g., per-minute usage rates, variable wireless coverage, etc.).

Other enhanced services are possible in various embodiments. For instance, in another embodiment, providing enhanced services can include providing a click-to-call functionality. In one aspect of such functionality, a subscriber can initiate a call (or at least select a target number) on his wireless device (e.g., by selecting a contact from an address book on the wireless, selecting a link in a browser on the wireless device, or any of a variety of other methods of call initiation). The call, however, can be placed with the wireline phone at the subscriber's location. Merely by way of example, in some cases, the wireline network will, place a first call to the wireline number at the subscriber's location, place a second call to the target number (i.e., the number to which the subscriber attempts to place a call with the wireless device), and join the first and the second calls, allowing a subscriber to conduct a call, using the wireline phone, with another party at the target number. In an aspect, such embodiments can provide the convenience of a wireless device (including, inter alia, the subscriber's personal address book and/or the computing abilities of the wireless device) without the attendant disadvantages of wireless service described above.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, a method of providing a wireline telephone subscriber with enhanced wireline service, in accordance with one embodiment, might comprise maintaining a list of one or more wireline locations for which enhanced wireline services should be provided to the subscriber. In an aspect, each of the one or more wireline locations might have associated therewith a wireline subscriber number. Merely by way of example, in one embodiment, the one or more wireline locations comprises a first wireline location having associated therewith a first wireline subscriber number.

In some cases, the method further comprises detecting a location of a wireless device associated with the subscriber, and/or determining that the location of the wireless device corresponds to the first wireline location. The method then, might comprise providing, with a wireline telephone network, enhanced wireline services at the wireline subscriber number associated with the first wireline location.

A variety of enhanced wireline services are possible. For instance, in some embodiments, providing enhanced wireline services might comprise enabling a call forwarding service to forward one or more telephone calls to the first wireline subscriber number. Merely by way of example, if the one or more wireline locations comprises a second wireline location having associated therewith a second wireline subscriber number, which is a home of the subscriber and the second wireline subscriber number being a home telephone number of the subscriber, and if the first wireline location is a location other than the home of the subscriber, forwarding one or more telephone calls to the first wireline subscriber number might comprise automatically enabling a call forwarding service to forward to the first wireline number all calls addressed to the home telephone number of the subscriber, based on a determination that the location of the wireless device corresponds to the first wireline location.

In some cases, the method might further comprise detecting a second location of the wireless device. If it is determined that the second location of the wireless device corresponds to the home of the subscriber, the method might also comprise disabling the call forwarding service, based on a determination that the subscriber is located at the home of the subscriber. On the other hand, if the system determines that the second location of the wireless device does not correspond to any of the one or more wireline locations for which enhanced wireline services should be provided, the method might comprise re-enabling the call forwarding service to forward one or more calls to a wireless subscriber number associated with the wireless device In other embodiments, providing enhanced wireline services at the first wireline subscriber number might comprise detecting an attempt to originate a telephone call from the wireless device to a target telephone number, and/or placing a call to the target telephone number from the first wireline telephone number. Merely by way of example, the system might originate a first call to the first wireline telephone number from a wireline service provider, originate a second call to the target telephone number, and/or join the first call and the second call.

Another set of embodiments provides apparatus. An exemplary apparatus might comprise a computer readable medium having encoded thereon a set of instructions executable by one or more computers to perform one or more operations. The set of instructions might comprise instructions for maintaining a list of one or more wireline locations for which enhanced wireline services should be provided to the subscriber, each of which might associated therewith a wireline subscriber number; for example, the one or more wireline locations might comprise a first wireline location having associated therewith a first wireline subscriber number. The set of instructions might further comprise instructions for detecting a location of a wireless device associated with the subscriber, instructions for determining that the location of the wireless device corresponds to the first wireline location, and/or instructions for providing, with a wireline telephone network, enhanced wireline services at the wireline subscriber number associated with the first wireline location. (In some cases, providing enhanced wireline services might comprise instructing another device to provide enhanced wireline services. Merely by way of example, if the set of instructions is executable by a wireless device, the instructions for providing enhanced wireline services might comprise instructions to direct an application server to provide the enhanced wireline services; likewise, the application server might have instructions to direct a telephony switch to provide the enhanced wireline services.)

Yet another set of embodiments provides computer systems, an example of which might comprise one or more processors and a computer readable medium in communication with the one or more processors, the computer readable medium having encoded thereon a set of instructions executable by the computer system to perform one or more operations, such as, for example the set of instructions described above.

In some cases, a wireless device might comprise the computer system (or a portion thereof), in which case the instructions for providing enhanced wireline service might comprise instructions for communicating with the wireline telephone network to cause the wireline telephone network to provide the enhanced wireline services. In other cases, the computer system might reside within the wireline network (e.g., as an application server, telephony switch, etc.), in which case the instructions for detecting the location of the wireless device might comprise instructions for receiving, from the wireless device, information about the location of the wireless device.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
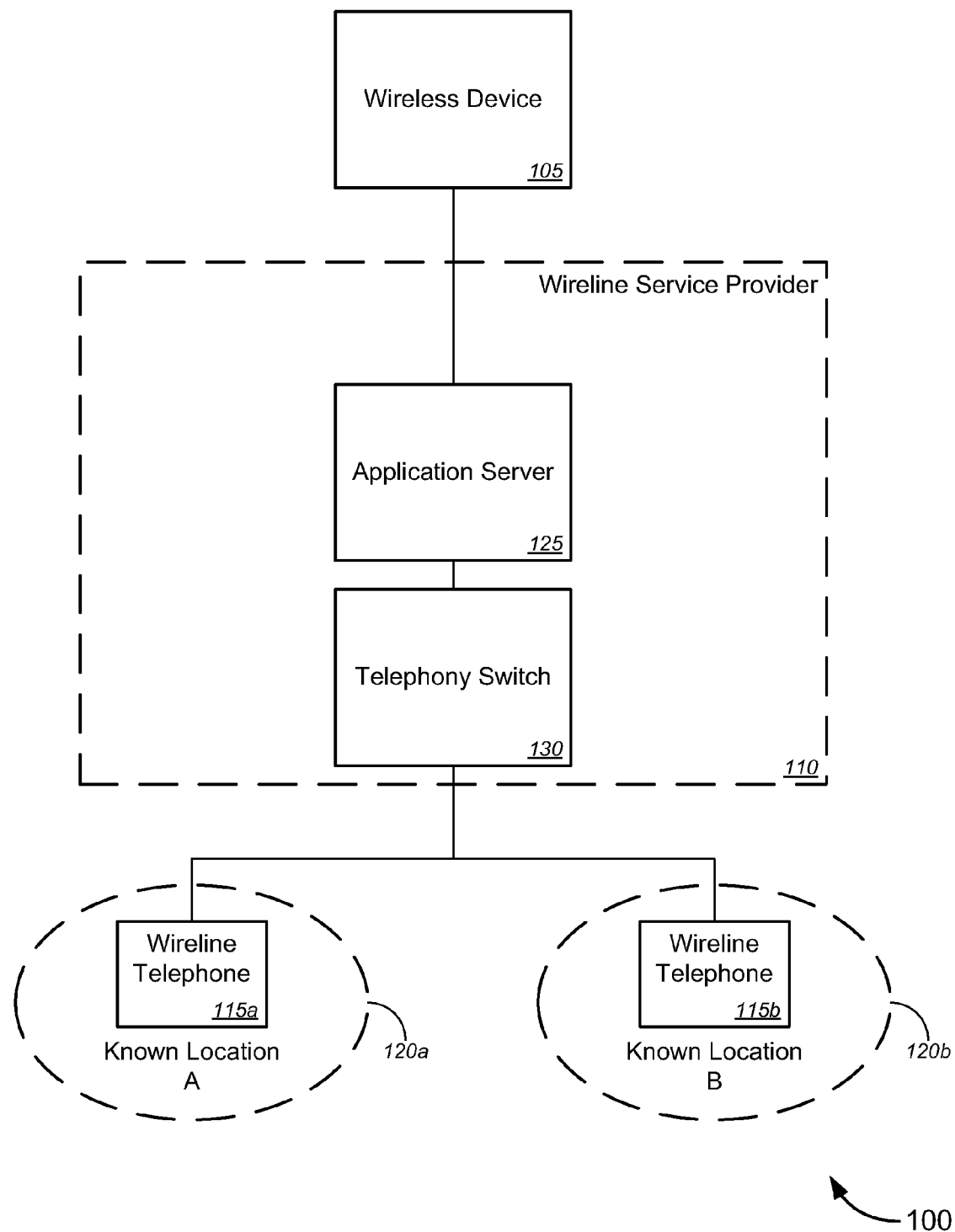
FIG. 1 is a block diagram illustrating a system for providing enhanced wireline services, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Terms such as "element" or "component" encompass both elements and components comprising one unit and elements and components that comprise more than one unit, unless specifically stated otherwise.

Certain embodiments provide solutions that can provide some of the advantages of both wireline and wireless service, while minimizing some of the disadvantages of each. Some of these solutions comprise tools and techniques that provide enhanced wireline services at one or more known wireline locations. In some cases, these tools and techniques involve determining that a subscriber is at one or more of the known wireline locations based on a detected location of the subscriber's wireless device (e.g., wireless phone, portable computer, etc.).

Such a determination can be made, for example, based on location services provided by (or to) the wireless device, using technologies such as global network satellite system ("GNSS") receivers (of which global positioning system "GPS") receivers are a subset), cellular base station triangulation, WiFi-based location services (such as those provided by Skyhook, Inc.), and/or the like. In some cases, for example, an application on a wireless device might poll its location periodically (e.g., by polling a GPS receiver, by interrogating a Wi-Fi-based location service). In other cases, the device might be configured to receive location information only when the location changes, and/or when the wireless device arrives at a location of interest. The wireless device's detected location can be compared with a database of known wireline locations to determine that the wireless device (and, by implication, the user of that device) is present at a particular wireline location (in some cases, to within a specified proximity). Once the subscriber's presence at that wireline location has been detected, enhanced services can be provided to a wireline telephone at that location.

A variety of enhanced wireline services can be provided through a wireline telephone once the subscriber's presence at the location of that telephone has been identified. Merely by way of example, in some cases, telephone calls, which might be directed to one or more telephone numbers ("forwarded numbers") associated with the subscriber, might be forwarded to a number corresponding to the wireline telephone at that location. The forwarded number(s) can include, without limitation, the subscriber's wireless number, other wireline numbers (e.g., a subscriber's home telephone number, work telephone number, and/or the like). Thus, when a subscriber is at a known location, calls for that subscriber (at any of several numbers, in some cases) can be forwarded to a wireline telephone at that location. In an aspect, such embodiments can provide the mobility and accessibility traditionally afforded by wireless telephones, but without the attendant disadvantages of wireless services (e.g., per-minute usage rates, variable wireless coverage, etc.).

As another example, some embodiments provide click-to-call functionality as an enhanced wireline service. In one aspect of such embodiments, a subscriber can initiate a call (or at least select a target number) on a wireless device (e.g., by selecting a contact from an address book on the wireless, selecting a link in a browser on the wireless device, or any of a variety of other methods of call initiation). The call, however, can be placed via the wireline phone at the subscriber's current location (e.g., as identified by the location of the subscriber's wireless device). Merely by way of example, in some cases, the wireline network might place a first call to the target number (i.e., the number to which the subscriber attempts to place a call with the wireless device), place a second call to the wireline number at the subscriber's location, and join the first and the second calls, allowing a subscriber to conduct a call, using the wireline phone, with another party at the target number. In an aspect, such embodiments can provide the convenience of a wireless device (including, inter alia, the subscriber's personal address book and/or the computing abilities of the wireless device) without the attendant disadvantages of wireless service described above.

Consider FIG. 1, which illustrates, in block diagram form, the components of an exemplary system 100 for providing enhanced wireline services to a subscriber with a wireless device 105. As noted above, in some cases, the wireless device will be a wireless phone (e.g., a smartphone), although other types of wireless devices can be used with various embodiments. The system 100 further comprises a wireline service provider 110, which provides wireline (e.g., POTS, VoIP, etc.) telephone service to a plurality of wireline telephones 115.

As illustrated, the plurality of wireline telephones 115 comprises a first wireline telephone 115a, which is situated at a known location 120a, and a second wireline telephone 115b, which is situated at a second known location 120b. (It should be appreciated, of course that the wireline service provider 110 generally will provide wireline service to a great number of wireline phones, some or all of which will be situated at known locations, but that for convenience, FIG. 1 illustrates only two such telephones 115).

In certain embodiments, the system 100 is equipped to detect the location of the wireless device 105 using any of a variety of available techniques (including without limitation GNSS solutions, cellular base station triangulation, WiFi location services and/or the like). Such location detection techniques are known to those skilled in the art, and a detailed discussion of their implementation and/or selection is unnecessary, other than to note that some such techniques (e.g., GNSS position determination) might rely on the wireless device 105 to detect its own position (and/or communicate that information to the wireline service provider 110), while other techniques (e.g., cellular base station triangulation) might rely on the provider 110 (and/or a separate wireless service provider) to detect the position of the wireless device 105 (and/or communicate that information to the wireless device 105).

The wireline service provider 110 operates conventional equipment for providing wireline service, including without limitation a PSTN (and/or components thereof, such as standard advanced intelligent network ("AIN") and/or Signaling System No. 7 ("SS7") components including service switching points ("SSP"), service control points ("SCP"), various other switches, gateways, and the like), a VoIP network (and/or components thereof, such as a data network, a VoIP soft switch, etc.). Such equipment can be operated in a conventional manner, except as described herein, and need not be described in detail other than to note that the wireline service provider operates an application server 125 in communication with the wireless device 105 (as described in further detail below) and a telephony switch 130 (which might be a VoIP switch, an SSP and/or SCP, etc.) that is in communication with the wireline telephones 115 and provides telephony services (including both conventional telephony services and the enhanced wireline service described herein) to the wireline telephones 115. (Once again, while FIG. 1 illustrates only one switch 130, it should be understood that a typical implementation will include a plurality of switches 130 with trunk connections to provide connectivity between a plurality of wireline telephones 115 in the conventional manner.) Standard and/or proprietary communication facilities (e.g., fiber optic lines, twisted pair, wireless links, etc.) may be used to provide communication between the various devices of the system 100.

In an embodiment, the application server 125 communicates with the wireless device 105 over the Internet and/or a private network (e.g., a network operated by the wireline provider 110 and/or a wireless provider). Various communication arrangements are possible between the wireless device 105 and the application server 125, including without limitation communication via Internet Protocol ("IP"), and any such arrangement may be used in accordance with various embodiments. The application server 125 also communicates with the one or more telephony switches 130, perhaps via IP. Thus, in an aspect, the application server 125 provides an interface between the wireless device 105 and the wireline network.

While not illustrated on FIG. 1, a database (or other data storage arrangement) may be present within the system 100. (The term, "database," should be interpreted broadly to include any structured, unstructured, or relational data storage arrangement, including without limitation directories, such as those that employ lightweight directory access protocol ("LDAP"), databases managed by a relational database management system ("RDBMS"), delimited or non-delimited files on a file system, etc.). The database might reside on the wireless device 105, the application server 125, a computer system separate from (but in communication with) either the wireless device and/or the application server 125 each, or some combination of the above. In an aspect, the database might store, for each of a plurality of subscribers, a list of known wireline locations, correlated with one or more wireline telephone numbers (sometimes referred to herein as "wireline subscriber numbers") associated with each known wireline location, perhaps including an identifier (e.g., "Home," "Work," etc.) for each known location.

The database might also store, for each wireline location, an identification of one or more enhanced services that should be provided to the subscriber at that wireline location. Further, the database might store, for some or all of the identified services, one or more operational parameters. Merely by way of example, if a particular wireline location should be provided with call forwarding services when the subscriber is at that location, the database might store an indication that this service should be provided, as well as a list of directory numbers that should be forwarded to the wireline telephone at that location.

The operation of the system 100 is described in more detail below with respect to FIGS. 2-5, but in general, when the system 100 detects that the wireless device 105 is at a location corresponding to a known wireline location (e.g., Known Location A 120a), the telephony switch 130 provides enhanced wireline services to a wireline telephone (e.g., wireline telephone 115a) at that location. When the wireless device 105 moves to a new location, the system determines whether the new location corresponds to another wireline telephone (e.g., if the wireless device 105 moved to Known Location B 120b, the system 100 would determine that the location of the wireless device 105, and therefore the subscriber, corresponded to the wireline telephone 115b associated with that location, and would provide enhanced wireline service to that wireline telephone 115b). In an aspect of some embodiments, once the wireless device 105 leaves a known wireline location 120, the system 100 detects that change and disables the enhanced wireline services at the corresponding wireline telephone. In some cases, the system 100 might then forward calls to the wireless device 105 itself, unless and until the wireless device 105 reaches another known location 120.

For example, in one embodiment Known Location A 120a might be the wireless subscriber's home, and the wireline telephone 115a associated with that location might be the wireless subscribers home telephone, to which the wireless subscriber's home telephone number is assigned. Known Location B 120b might be the wireless subscriber's parents' home, and the wireline telephone 115b at that location might be the parents' home telephone, to which the parents' home telephone number is assigned. When the wireless subscriber (and the wireless device 105) are at home (at Known Location A 120a), the system 100 might forward the wireless subscriber's office telephone number and the wireless subscriber's wireless number (e.g., the number assigned to the wireless device 105 itself) to the subscriber's home telephone number, so that calls placed to either the office telephone number or the wireless telephone number are instead terminated at the wireline telephone 115a. Similarly, the system 100 might implement other features, such as click-to-call, so that if the subscriber attempts to originate a telephone call from the wireless device 105, that call is instead originated from the wireline telephone 115a.

Continuing the example, if the subscriber travels to his parents' house (i.e., Known Location B 120b) for dinner, the system, upon detecting that the wireless device 105 has left the subscriber's house (i.e., Known Location A 120a), will disable the enhanced wireline services provided to his home wireline telephone 115a. For example, the system 100 might disable call forwarding from the wireless device 105 number and/or the office telephone number to the home wireline telephone 105 number. In some cases, because the system 100 detects that the wireless device 105 is not at a location corresponding to any known wireline telephone, the system 100 might automatically forward one or more numbers (e.g., the number assigned to the wireline telephone 115a, the subscriber's office telephone number, etc.) directly to the number assigned to the wireless device 105.

When the subscriber reaches his parents' home (i.e., Known Location B 120b, in this example), the system 100 detects that the wireless device 105 is at a location corresponding to the wireline telephone 115b, and it automatically enables enhanced wireline services to that wireline telephone 115b. Merely by way of example, the system 100 might enable call forwarding from the subscriber's home telephone number (i.e., the telephone number assigned to wireline telephone 115a), the telephone number assigned to the wireless device 105, the subscriber's office telephone number, and/or the like, to the number assigned to the wireline telephone 115b at the subscriber's parents' home. As another example, the system 100 might enable click to call functionality for the wireless device 105, using the wireline telephone 115b at the parents' home (for example, as described above).

The system 100 can employ a number of different techniques to provide this functionality. In most cases, the application server 125 receives input from the wireless device 105 and, based on that input, programs the telephony switch 130 to provide the enhanced wireline services to the appropriate wireline telephone 115. In some cases, a plurality of telephony switches 130 might be in communication with the application server, and the application server 125 might program the appropriate switch to correspond to the wireline telephone 115 that should be provided with the enhanced wireline services. One skilled in the art will appreciate that there are a number of different techniques for providing communication between an application server 125 and one or more telephony switches 130, and that any appropriate technique may be selected in accordance with different embodiments.

In an aspect, the application server 125 can be any computer system capable of interfacing (either directly or via other, intermediary devices) with the wireless device 105 and the telephony switch(es) 130. Moreover, a number of techniques can be used to provide communication between the application server 125 and the wireless device 105. Merely by way of example, in some cases, the described functionality might be provided by a dedicated application running on the wireless device 105 and/or an application programming interface ("API") executing on the application server 125; the API might receive information from the application and cause the application server to perform accordingly. In other cases, a web service model might be employed, in which the wireless device 105 communicates via standard protocols (e.g., HTML, XML, Simple Object Access Protocol ("SOAP"), Representational State Transfer ("REST"), etc.) with a web service running on the application server. Other communication models are possible as well.

Moreover, the nature of the interaction between the wireless phone 105 and application server 125, and the division of functionality between those devices, can vary by embodiment. Hence, in many embodiments, the functionality ascribed to the system 100 can be performed, in various combinations, by the wireless device 105 itself, the application server 125, and/or the telephony switch 130. Moreover, the functionality of the application server 125 and the telephony switch 130 might be integrated in a single device in some embodiments.

To illustrate one possible arrangement, in certain embodiments, the wireless device 105 might simply determine its location and (e.g., periodically, upon determining that the location has changed, perhaps by some specified degree, and/or upon user request) notify the application server 125 of that location. (In other cases, the wireless device 105 might not even need to provide any information to the application server 125; for example, a location service external to the wireless device 105, such as a WiFi position determination system, a base station triangulation system, and/or the like might provide location information to the wireless device 105 and/or directly to the application server 125). In such embodiments, the application server 125 might be configured to use the location of the wireless device 105 to perform the operations necessary to determine whether and/or where to provide enhanced wireline service, as described in further detail below.

In other embodiments, the wireless device 105 might provide a larger portion of the functionality of the system 100. Merely by way of example, the wireless device 105 (or, more precisely, in some cases, an application running on the wireless device 105) might detect the location of the wireless device (e.g., via signals obtained by a GNSS receiver in, or in communication with, the wireless device 105, and/or using one of the other techniques described herein) and determine whether that location corresponds to one of several known wireline locations (a database of which might be maintained by the wireless device). Based on this determination, the wireless device might instruct the application server 125 to provide enhanced wireline services at a wireline location corresponding to the current location of the wireless device 105. In further embodiments, the wireless device 105 might even participate in providing the enhanced wireline services. For example, the wireless device 105 might be configured with an application to detect an attempted outgoing call, intercept the attempted call, and instruct the application server 125 to place a call using the wireline telephone at the current location of the wireless device 105. A variety of other functional arrangements are possible as well.

FIGS. 2-5 illustrate various methods that can be used to provide enhanced wireline services. While the methods of FIGS. 2-5 are illustrated, for ease of description, as different methods, it should be appreciated that the various techniques and procedures of these methods can be combined in any suitable fashion, and that, in some embodiments, the methods depicted by FIGS. 2-5 can be considered interoperable and/or as portions of a single method. Similarly, while the techniques and procedures are depicted and/or described in a certain order for purposes of illustration, it should be appreciated that certain procedures may be reordered and/or omitted within the scope of various embodiments. Moreover, while the methods illustrated by FIGS. 2-5 can be implemented by (and, in some cases, are described below with respect to) the system 100 of FIG. 1 (or components thereof), these methods may also be implemented using any suitable hardware implementation. Similarly, while the system 100 of FIG. 1 (and/or components thereof) can operate according to the methods illustrated by FIGS. 2-5 (e.g., by executing instructions embodied on a computer readable medium), the system 100 can also operate according to other modes of operation and/or perform other suitable procedures. Further, as noted above, various embodiments may distribute the functionality depicted by the various operations of FIGS. 2-5 among the components of the system 100 in different ways. For example, in some cases, relatively more of the system functionality might reside with the wireless device 105, while in other embodiments, relatively more of the system functionality might reside with the application server 125.

Figure 2:
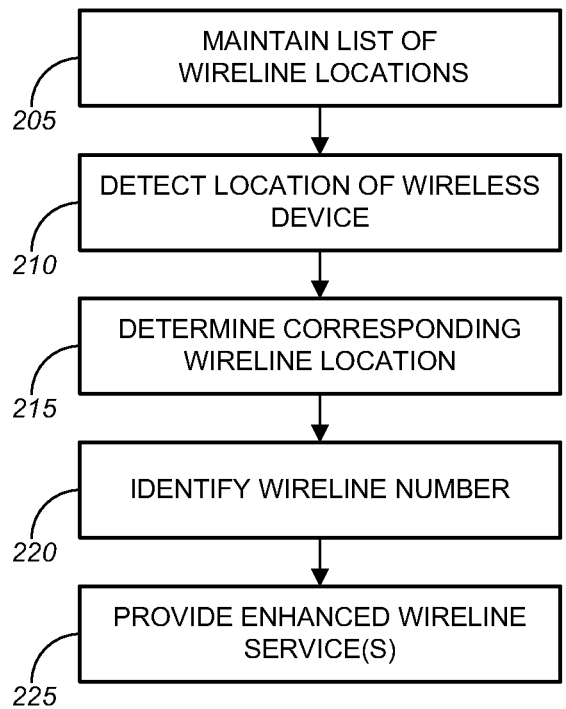
FIGS. 2-5 are process flow diagrams illustrating various methods that can be used to provide enhanced wireline services, in accordance with various embodiments.

Turning to FIG. 2, the method 200 comprises, at block 205, maintaining a list of wireline locations (sometimes referred to herein as "known wireline locations") for which enhanced wireline services are to be provided to the subscriber. In an aspect, maintaining a list of wireline locations might comprise storing each of the known wireline locations in a database (e.g., storing a latitude/longitude pair, address, etc., corresponding to each known wireline location), adding additional wireline locations to the database, and/or any other operation that involves tracking wireline locations at which to provide the enhanced services described herein. In an aspect, each of the known wireline locations is associated, in the database, with one or more wireline telephone numbers at which enhanced wireline services can be provided at that location.

Figure 3:
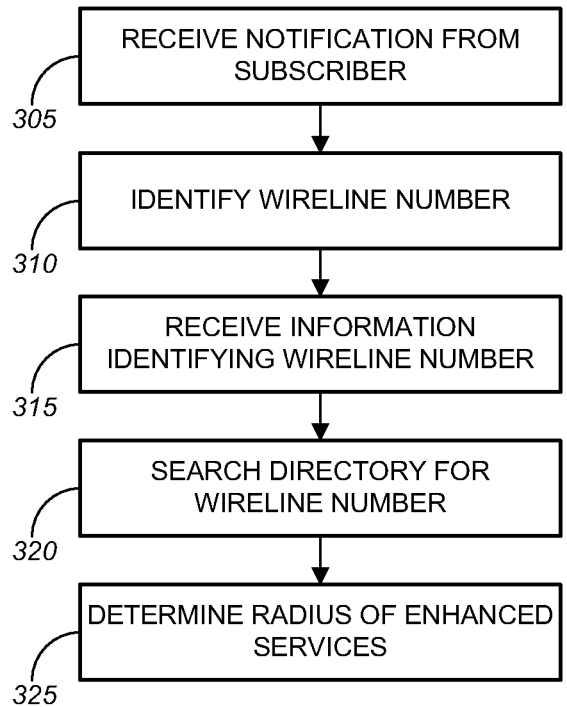

For example, FIG. 3 illustrates a method 300 adding a wireline location to a list of wireline locations. In some embodiments, the method 300 comprises receiving a notification from a subscriber that a wireline location should be added to the list (block 305). The notification can be received in a variety of ways. Merely by way of example, in some cases, the application server might provide a web site (e.g., using a web server integrated with, or in communication with, the application server) that provides a user interface to allow a subscriber to provide input notifying the system that a wireline location should be added to the list, and such a notification could be received from the subscriber at the web site.

In other embodiments, an application running on the wireless device might be configured to receive input from the subscriber (and/or to obtain data from a GNSS receiver) to identify a location to be added to the list. Merely by way of example, in a particular embodiment, the wireless device might provide an interface to allow the subscriber to mark the wireless device's current location (e.g., as identified by GNSS data) and/or any other location (e.g., as identified by an address input by the subscriber) as a wireline location to be added to the list. The wireless device, then, might store, in a local database, information about the identified location, and/or transmit that that notification (including the location information) to the application server (e.g., via an API, a web service, etc.), depending on the embodiment.

At block 310, the method might comprise identifying a wireline number corresponding to the wireline location. A variety of techniques might be used to identify the wireline number. For example, in a particular embodiment, the system might receive information identifying the wireline number (block 315, e.g., from the subscriber. (For example, after marking a location with the wireless device, the subscriber might be prompted with an interface to identify a wireline number associated with that location. Alternatively and/or additionally, the method 300 might comprise searching a directory (e.g., a telephone listing directory maintained by the wireline provider) for a wireline number corresponding to the wireline location (block 325). Other techniques are possible as well. Merely by way of example, if the wireline telephone provider is also a data provider, an IP address of a device (e.g., the wireless device) at the location could be used to lookup a corresponding telephone number.

In some cases, it may be beneficial to define the scope of the wireline location, such that, if the subscriber (or, more precisely, the subscriber's wireless device) is within the scope of the wireline location, the system should provide enhanced wireline services to the wireline number. Accordingly, the method 300 might comprise determining a radius of enhanced services (block 325).

As one skilled in the art will appreciate, a location might be defined in a number of ways. For example, a location might be defined as an address, which identifies a parcel of land (or a portion thereof). In other cases, a location might be defined as a latitude/longitude pair (or by reference to some other reference coordinate system), which defines, to some specified precision, a specific point on the Earth. It might not be useful, however, to confine the provision of enhanced wireline services to situations when the wireless device (and/or subscriber) is at that specific point. Rather, it might be more useful to provide such services when the wireless device (and/or subscriber) is within some specified radius of that point (or address).

Accordingly, in some cases, the system might define (or receive input from the subscriber to specify) one or more radii (which typically, but not necessarily, will define a circular area centered on the location marked as a known wireline location) that specifies the scope of that wireline location. When the wireless device (and/or subscriber) is within that area, the subscriber is considered to be at the known wireline location. This radius (or radii) might be defined based on subscriber input (e.g., via the same interface used by the subscriber to mark a wireline location), and/or a default radius might be provided by the system. In some cases, the subscriber might be provided with the option, e.g., on a per-location basis, to define one or more radii, to use the system default radius, or not to expand the scope of the wireline location at all. In other cases, the scope of the wireline location might be defined automatically, without input from (and/or notification to) the subscriber.

In some cases, the radius use to define the scope of the wireline location might be variable and/or dynamic, based on the location-determination technology in use at the time the wireless device is at the location. For example, it is known that different location-determination technologies have different levels of precision and/or accuracy. Accordingly, for example, if the wireless device is using GNSS data to obtain location fix, the radius might be relatively small, while if the wireless device is using cellular triangulation (which is generally known to have lower precision than GNSS solutions), the radius might be relatively larger, since the wireless device might appear to be outside the smaller radius even while the wireless device is in fact at that location, just because of the imprecision of the location solution.

One or more operations of the method 300 can be repeated as desired to add additional known wireline locations to the list. Of course, it should be appreciated that other techniques might be used to populate a list of wireline locations. Merely by way of example, a provider might auto-populate the list with one or more wireline telephone numbers associated with a wireless subscriber's account and/or might receive from the subscriber an identification of one or more of wireline numbers at which enhanced wireline services should be provided. The subscriber might then identify locations correlating to these numbers (e.g., via directory information, account information, other geolocation techniques, etc.), and add those locations (and the correlated numbers) to the list of known wireline locations.

Returning to FIG. 2, at block 210, the method 200 comprises detecting a current location of the wireless device. The current location might be detected, e.g., at the wireless device and/or the application server, by obtaining GNSS data from a GNSS receiver incorporated within (or in communication with) the wireless device. Alternatively and/or additionally, any other suitable technique (including without limitation those described above, such as WiFi and/or cellular triangulation) may be employed to detect the current location of the wireless device. The detected location might be used locally by the wireless device, and/or location data might be transmitted to the application server for its use, in accordance with the techniques described herein.

The method 200 might further comprise determining a wireline location corresponding to the detected location of the wireless device (block 215). In an aspect, for example, the system (e.g., the application server and/or the wireless device) might search the list of known wireline locations for the detected location and/or compare the detected location with each location in the list of known wireline locations for that subscriber. Any of several known location search/comparison techniques can be used for this purpose. If the system finds a match (to within any specified radius) for the current location within the list of known wireline locations, the system determines that the location of the wireless device corresponds to that wireline location (i.e., that the subscriber is located at the matching known wireline location). At block 220, the method 200 comprises identifying a wireline telephone number associated with the determined wireline location, for example, by looking up, in the database, a wireline number that corresponds to the determined location of the wireless phone.

At block 225, the method 200 comprises providing enhanced wireline service(s) at the determined wireline location (i.e., at a wireline telephone to which is assigned the wireline telephone number that corresponds to the location of the wireless device). In some cases, for example, the application server (or wireless device) will obtain, from the list of wireline locations, an identification of one or more enhanced services that should be provided when the subscriber is at the identified wireline location. The application server will reconfigured the appropriate telephony switch in order to provide the identified enhanced wireline services (such as call forwarding). In other cases, the wireless device might be involved in the provision of the enhanced wireline services (such as click-to-call), and no reconfiguration of the telephony switch might be needed.

Figure 4:
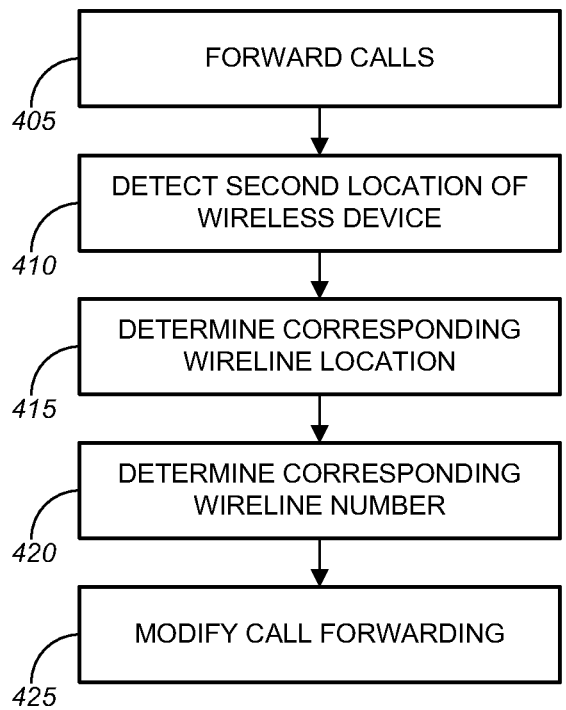

As noted above, embodiments can allow for the provision of a variety of enhanced wireline services. Merely by way of example, FIG. 4 illustrates a method of providing call forwarding as an enhanced wireline service. Among other things, the method 400 illustrated by FIG. 4 can be used to automatically enable a call forwarding service to forward, to a wireline telephone at the subscriber's current location, some or all calls directed to the subscriber's home telephone number, office telephone number, wireless number, etc.

At block 405, the method 400 comprises forwarding one or more calls to an identified wireline number (e.g., a telephone number assigned to a wireline telephone at a known wireline location corresponding to the current location of the subscriber and/or the subscriber's wireless device). As noted above, in some cases, the system will maintain a list of wireline locations to which calls should be forwarded, based on the subscriber's presence, and the system might also maintain a list of telephone numbers that should be forwarded to each of those locations (the list of forwarded telephone numbers might be the same for all wireline locations, or it might be different for each wireline location).

Based on a determination that the subscriber is at a known wireline location (a determination that case be made using, for example, the method 200 described with respect to FIG. 2, above), the system (e.g., the wireless device, the application server, etc.) might determine that calls should be forwarded from one or more forwarded numbers to the wireline telephone number associated with the wireline location that corresponds to the subscriber's current location, based on the subscribers preferences (which, as noted above, might be stored in the database with the list of known wireline locations). The system might also determine which numbers should be forwarded. Based on these determinations, the application server reconfigures one or more telephony switches to forward, to the wireline number associated with the subscriber's current location, calls directed to (i.e., intended by the caller to be terminated at) the forwarded number(s), e.g., using conventional, switch-based call forwarding techniques. Any such calls, therefore, can be answered by the subscriber at the wireline telephone. In some cases, the forwarded calls might be announced by a special ring tone or pattern, etc., to indicate that they are forwarded calls.

In some cases, if the system determines that the current location of the wireless device does not correspond to any known wireline location, the system might instead forward the forwarded numbers to the number of the wireless device itself. Alternatively, if the subscriber is not at a known location, the system might disable forwarding altogether and/or forward calls to a default telephone number (e.g., the subscriber's home telephone number, etc.), a number specified by the subscriber, and/or the like.

In one inventive aspect, certain embodiments automatically account for the subscriber's current location at any given time. Hence, when a subscriber leaves one known location and/or arrives at another known wireline location, the system can adjust the provision of enhanced services (e.g., call forwarding) accordingly. Merely by way of example, the system might automatically enable or disable call forwarding, or change the wireline number to which calls are forwarded, based on the changing location of the subscriber and/or his wireless device.

Hence, in accordance with some embodiments, at block 410, the system detects a second location of the subscriber and/or the subscriber's wireless device, and at block 415, the method 400 comprises determining a second wireline location corresponding to the second location of the subscriber (e.g., as described above with respect to FIG. 2). In some cases, if the second wireline location is a known wireline location with a corresponding wireline number, the method 400 might comprise determining a wireline number associated with the second wireline location (block 420), e.g., by looking up the number is the database of known locations, and/or using any of the number determination techniques described above. At block 425, the system modifies the call forwarding service, based on the second location of the subscriber. Merely by way of example, if the system determines that the subscriber's current location corresponds to the subscriber's home, the system might disable call forwarding altogether (e.g., if the subscriber's home telephone number is the only forwarded number) and/or might reconfigure the appropriate telephony switches to forward calls from other forwarded numbers to the subscriber's home telephone number.

In other cases, as noted above, if the second location of the wireless device is determined not to correspond to any known wireline location, the system might disable the call forwarding service altogether, and/or might re-enable the call forwarding service to forward calls to a wireless subscriber number associated with the wireless device itself.

Figure 5:
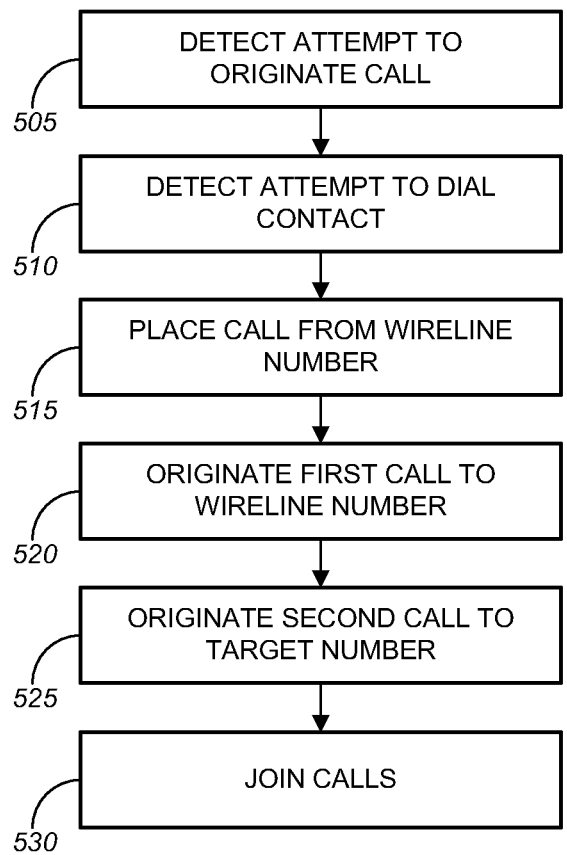

As noted above, click-to-call functionality is another enhanced wireline service that can be provided by certain embodiments. FIG. 5 illustrates a method 500 that discloses a technique for providing click-to-call functionality, in accordance with some embodiments.

The method 500 comprises detecting an attempt to originate a call from a wireless device (block 505). There are a variety of techniques that can be used to detect an attempt to originate a call from the wireless device; some techniques might employ software local to the wireless device, while others might be performed at the application server and/or at a wireless switch. Merely by way of example, in some cases, detecting an attempt to originate a call might comprise receiving a selection of a contact (e.g., from an address book application on the wireless device), and/or by detecting an attempt by the user to dial the contact on the wireless device, as depicted by block 510. The wireless device, for example, might be configured with software to detect and/or intercept an attempt to make outgoing call (whether by selection of a contact or otherwise). In some cases, the application might be configured to present the user with a choice of dialing the contact directly from the wireless device (in conventional fashion) or calling the contact from the wireline telephone at that location. In other cases, the system might be configured to use the wireline telephone automatically.

Based on a determination (e.g., in accordance with the description of FIG. 2, above) that the subscriber is at a known wireline location, the software might intercept that attempt and/or instruct the application server to place the call using a wireline telephone associated with the known wireline location. Alternatively, a wireless switch might be equipped with a termination attempt trigger or the like, which causes the switch to seek termination instructions from the application server. Based on the determined location of the wireless device, the application server might instruct the wireless switch not to terminate the call, and also might instruct the wireline telephony switch to place the call from the wireline number.

At block 515, the system places a call from the wireline number corresponding to the wireline telephone at the location of the subscriber (e.g., the location of the wireless device) to the target number of the attempted call from the wireless device. There are a number of techniques that can be used to perform this operation. Merely by way of example, one such technique is illustrated by blocks 520-530.

At block 520, the system originates a first call to the wireline number. In an embodiment, the application server instructs the telephony switch to originate a call from the switch to the wireline number. At block 525, the system originates a second call to the target number (i.e., the number that the subscriber attempted to call with the wireless device), in similar fashion to the first call. At block 530, the system (e.g., the telephony switch, based on instructions from the application server) joins the first call with the second call. At that point, the subscriber may carry on a voice conversation with a party at the target number, using the wireline telephone at the subscriber's current location. There are a variety of techniques, and in particular switch-based techniques, for joining two calls, and any such technique may be used as appropriate.

It should be noted that the terms "first call" and "second call" do not denote any particular chronological ordering of the calls. For example, the telephony switch might place both calls simultaneously. In other embodiments, the system might first place the call to the target phone number and subsequently place a call to the number of the wireline telephone at that location, joining the calls thereafter. Other techniques may also be used to place a call from the wireline telephone to the target number.

Figure 6:
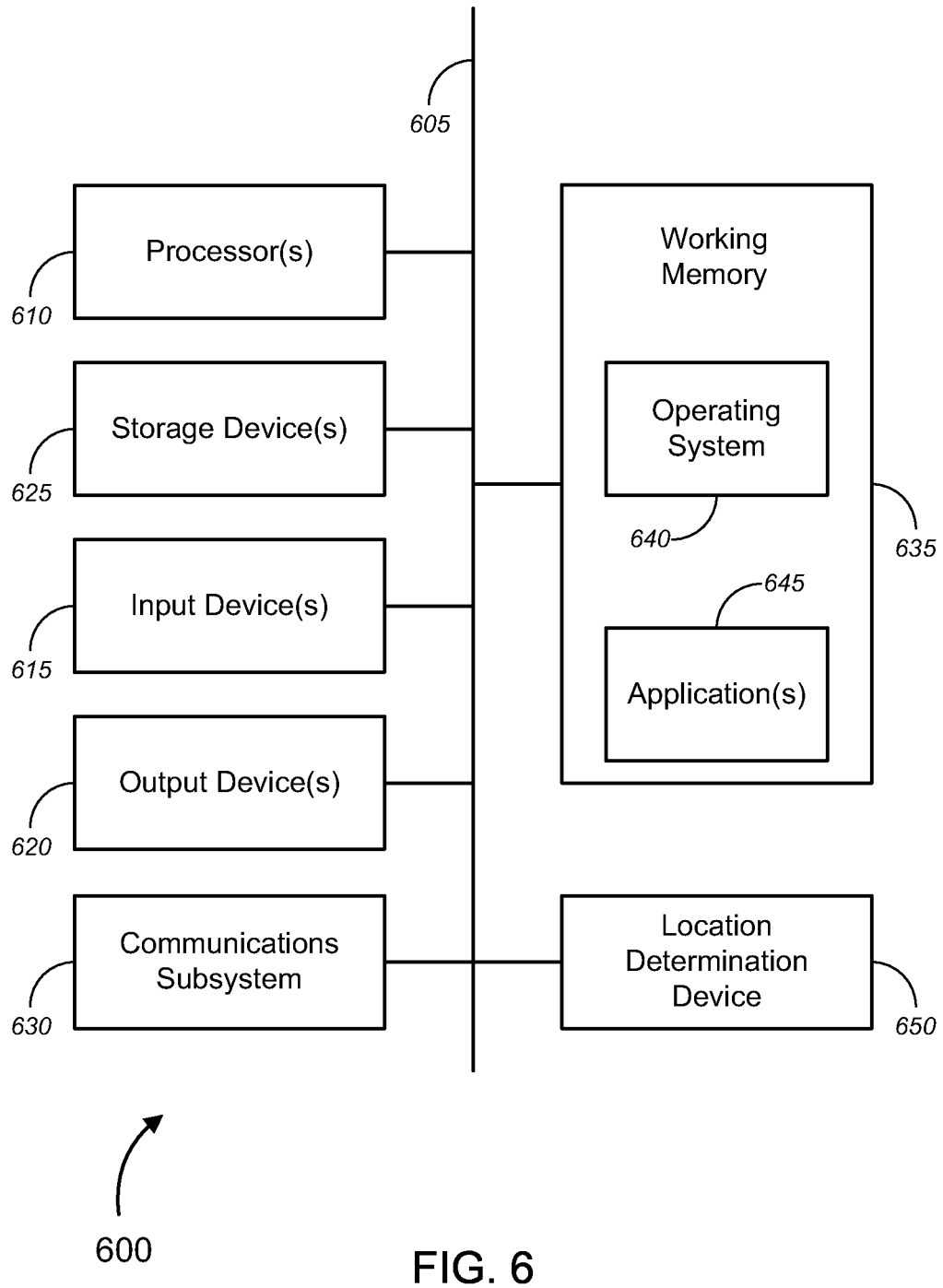
FIG. 6 is a generalized schematic diagram illustrating a computer system, in accordance with various embodiments.

FIG. 6 provides a schematic illustration of one embodiment of a computer system 600 that can perform the methods provided by various other embodiments, as described herein, and/or can function as a wireless device, application server, etc. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard and/or the like; and one or more output devices 620, which can include without limitation a display device, a printer and/or the like.

The computer system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), which can include any necessary radios and/or antennas, and/or the like. The communications subsystem 630 may permit data to be exchanged with a network (such as the network described below, to name one example), with other computer systems, and/or with any other devices described herein. In many embodiments, the computer system 600 will further comprise a working memory 635, which can include a RAM or ROM device, as described above.

The computer system 600 also may comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

In particular embodiments (in particular, when the computer system 600 serves as a wireless device), the computer system might further comprise a location determination device 650. A GNSS receiver is one example of such a device 650, although others are possible as well. In an aspect, the location determination device 650 communicates, e.g., via the bus 605, with other system components, such that it can receive operation instructions from, and provide data to, other components such as the processor 610. Accordingly, the location determination device 650 can be used by the computer system 600 to obtain location information in accordance with the techniques described above. It should be noted that the location determination device 650 might be separate from the computer system 600 and/or might have its own processing and/or communication facilities (such as those described in conjunction with the computer system 600), such that the location determination device 650 can exchange data with the computer system 600, e.g., via the computer system's 600 communication subsystem 630.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operation in a specific fashion. In an embodiment implemented using the computer system 600, various computer readable media might be involved in providing instructions/code to processor(s) 610 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 625. Volatile media includes, without limitation, dynamic memory, such as the working memory 635. Transmission media includes, without limitation, coaxial cables, copper wire and fiber optics, including the wires that comprise the bus 605, as well as the various components of the communication subsystem 630 (and/or the media by which the communications subsystem 630 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of providing a wireline telephone subscriber with enhanced wireline service, the method comprising:
   maintaining a list of one or more wireline locations for which enhanced wireline services should be provided to the subscriber, each of the one or more wireline locations having associated therewith a wireline subscriber number, the one or more wireline locations comprising a first wireline location having associated therewith a first wireline subscriber number;
   detecting a location of a wireless device associated with the subscriber;
   determining that the location of the wireless device corresponds to the first wireline location;
   providing, with a wireline telephone network, enhanced wireline services at the wireline subscriber number associated with the first wireline location based on the detected location of the wireless device, wherein providing enhanced wireline services comprises enabling a call forwarding service to forward one or more telephone calls to the first wireline subscriber number;
   detecting a second location of the wireless device;
   disabling the call forwarding service;
   determining that the second location of the wireless device does not correspond to any of the one or more wireline locations for which enhanced wireline services should be provided; and
   re-enabling the call forwarding service to forward one or more calls to a wireless subscriber number associated with the wireless device.

2. The method of claim 1, wherein:
   the one or more wireline locations comprises a second wireline location having associated therewith a second wireline subscriber number, the second wireline location being a home of the subscriber and the second wireline subscriber number being a home telephone number of the subscriber;
   the first wireline location is a location other than the home of the subscriber; and
   forwarding one or more telephone calls to the first wireline subscriber number comprises automatically enabling a call forwarding service to forward to the first wireline number all calls addressed to the home telephone number of the subscriber, based on a determination that the location of the wireless device corresponds to the first wireline location.

3. The method of claim 2, further comprising:
   detecting a third location of the wireless device;
   determining that the third location of the wireless device corresponds to the home of the subscriber; and
   disabling the call forwarding service, based on a determination that the subscriber is located at the home of the subscriber.

4. The method of claim 1, wherein providing enhanced wireline services at the first wireline subscriber number further comprises:
   detecting an attempt to originate a telephone call from the wireless device to a target telephone number; and
   placing a call to the target telephone number from the first wireline telephone number.

5. The method of claim 4, wherein placing a call to the target telephone number from the first wireline telephone number comprises
   originating a first call to the first wireline telephone number from a wireline service provider;
   originating a second call to the target telephone number from the wireline service provider; and
   joining the first call and the second call.

6. The method of claim 4, wherein detecting an attempt to originate a telephone call from the wireless device to a target telephone number comprises:
   receiving, at the wireless device, an attempt to dial a contact in an address book on the wireless device.

7. The method of claim 1, further comprising:
   receiving a notification from the subscriber that the first wireline location is a location at which enhanced wireline services should be provided; and
   identifying the first wireline telephone number associated with the first wireline location.

8. The method of claim 7, wherein identifying the first wireline telephone number comprises:
   receiving, from the subscriber, information identifying the first wireline telephone number.

9. The method of claim 7, wherein identifying the first wireline telephone number comprises searching a directory for a wireline telephone number corresponding to the first wireline location.

10. The method of claim 7, wherein identifying the first wireline telephone number comprises determining the first wireline telephone number based at least in part on an Internet Protocol address assigned to a device at the first wireline location.

11. The method of claim 10, wherein the device at the first wireline location is the wireless device.

12. The method of claim 7, wherein receiving a notification from the subscriber comprises receiving input at a web site.

13. The method of claim 7, wherein receiving a notification from the subscriber comprises receiving a notification from an application on the wireless device.

14. The method of claim 13, wherein receiving a notification from the wireless device comprises receiving data from the wireless device identifying a current location of the wireless device.

15. The method of claim 7, wherein receiving a notification from the subscriber comprises:
   receiving, from the subscriber, identification of a specific location; and
   receiving, from the subscriber, a radius from the specific location to define an area to be considered the first wireline location.

16. The method of claim 1, wherein detecting a location of the wireless device comprises receiving data from the wireless device identifying a current location of the wireless device.

17. The method of claim 16, wherein identifying a location of the wireless device comprises adjusting a radius defining a scope of the location of the wireless device, based on a level of precision of a location solution obtained for the wireless device.

18. The method of claim 1, wherein detecting a location of the wireless device comprises an operation selected from the group consisting of:

obtaining data from a global navigation satellite system ("GNSS") receiver associated with the wireless device; and obtaining triangulation data from one or more cellular base stations;

obtaining position information from a Wi-Fi location solution.

19. An apparatus, comprising:

a computer readable medium having encoded thereon a set of instructions executable by one or more computers to perform one or more operations, the set of instructions comprising:

instructions for maintaining a list of one or more wireline locations for which enhanced wireline services should be provided to the subscriber, each of the one or more wireline locations having associated therewith a wireline subscriber number, the one or more wireline locations comprising a first wireline location having associated therewith a first wireline subscriber number;

instructions for detecting a location of a wireless device associated with the subscriber;

instructions for determining that the location of the wireless device corresponds to the first wireline location;

instructions for providing, with a wireline telephone network, enhanced wireline services at the wireline subscriber number associated with the first wireline location based on the detected location of the wireless device, wherein providing enhanced wireline services comprises enabling a call forwarding service to forward one or more telephone calls to the first wireline subscriber number;

instructions for detecting a second location of the wireless device;

instructions for disabling the call forwarding service;

instructions for determining that the second location of the wireless device does not correspond to any of the one or more wireline locations for which enhanced wireline services should be provided; and instructions for re-enabling the call forwarding service to forward one or more calls to a wireless subscriber number associated with the wireless device.

20. A computer system, comprising:

one or more processors; and a computer readable medium in communication with the one or more processors, the computer readable medium having encoded thereon a set of instructions executable by the computer system to perform one or more operations, the set of instructions comprising:

instructions for maintaining a list of one or more wireline locations for which enhanced wireline services should be provided to the subscriber, each of the one or more wireline locations having associated therewith a wireline subscriber number, the one or more wireline locations comprising a first wireline location having associated therewith a first wireline subscriber number;

instructions for detecting a location of a wireless device associated with the subscriber;

instructions for determining that the location of the wireless device corresponds to the first wireline location;

instructions for providing, with a wireline telephone network, enhanced wireline services at the wireline subscriber number associated with the first wireline location based on the detected location of the wireless device, wherein providing enhanced wireline services comprises enabling a call forwarding service to forward one or more telephone calls to the first wireline subscriber number;

instructions for detecting a second location of the wireless device;

instructions for disabling the call forwarding service;

instructions for determining that the second location of the wireless device does not correspond to any of the one or more wireline locations for which enhanced wireline services should be provided; and instructions for re-enabling the call forwarding service to forward one or more calls to a wireless subscriber number associated with the wireless device.

21. The computer system of claim 20, wherein the wireless device comprises the computer system, and wherein the instructions for providing enhanced wireline services comprise instructions for communicating with the wireline telephone network to cause the wireline telephone network to provide the enhanced wireline services.

22. The computer system of claim 20, wherein the computer system resides within the wireline network.

23. The computer system of claim 22, wherein the instructions for detecting the location of the wireless device comprise instructions for receiving, from the wireless device, information about the location of the wireless device.

* * * * *